US008693842B2

(12) United States Patent
Srinivas et al.

(10) Patent No.: US 8,693,842 B2
(45) Date of Patent: Apr. 8, 2014

(54) SYSTEMS AND METHODS FOR ENRICHING AUDIO/VIDEO RECORDINGS (75) Inventors: Sharath Srinivas, Webster, NY (US); Johannes Antonius Koomen, Avon, NY (US)

(73) Assignee: Xerox Corporation, Norwalk, CT (US)

( * ) Notice: Subject to any disclaimer, the term of this patent is extended or adjusted under 35 U.S.C. 154(b) by 98 days.

(21) Appl. No.: 13/194,274

(22) Filed: Jul. 29, 2011

(65) Prior Publication Data
US 2013/0028574 A1    Jan. 31, 2013

(51) Int. Cl.
H04N 9/80 (2006.01)
G06F 3/00 (2006.01)
G06F 15/16 (2006.01)
G06F 17/00 (2006.01)

(52) U.S. Cl.
USPC ........... 386/240; 709/217; 715/201; 715/230; 715/268; 715/716; 715/751

(58) Field of Classification Search
USPC ...................... 386/240; 702/19, 20; 705/7.38; 707/999.01; 709/217, E17.009; 715/201, 230, 716, 268, 751
See application file for complete search history.

(56) References Cited

U.S. PATENT DOCUMENTS

| | | | |
|---|---|---|---|
| 6,424,362 B1 | 7/2002 | Bornstein et al. | |
| 7,373,590 B2 * | 5/2008 | Woolf et al. | 715/230 |
| 2002/0198905 A1 * | 12/2002 | Tabatabai et al. | 707/501.1 |
| 2004/0139100 A1 | 7/2004 | Gottsman | |
| 2005/0010571 A1 | 1/2005 | Solotorevsky et al. | |
| 2005/0197784 A1 * | 9/2005 | Kincaid et al. | 702/19 |
| 2005/0234958 A1 | 10/2005 | Sipusic et al. | |
| 2005/0289158 A1 | 12/2005 | Weiss et al. | |
| 2006/0041632 A1 * | 2/2006 | Shah et al. | 709/217 |
| 2006/0059117 A1 | 3/2006 | Tolson et al. | |
| 2008/0133539 A1 | 6/2008 | Kaarela et al. | |
| 2008/0301084 A1 | 12/2008 | Demarest et al. | |
| 2009/0024617 A1 | 1/2009 | Cope | |
| 2010/0169314 A1 | 7/2010 | Green et al. | |
| 2010/0250304 A1 * | 9/2010 | Whitaker et al. | 705/7 |

OTHER PUBLICATIONS

Karen Shiells, Omar Alonso, and Ho J. Lee, Generating document summaries from user annotations, in "Proceedings of the third workshop on Exploiting semantic annotations in information retrieval", ESAIR '10, pp. 25-26, New York, NY, USA, 2010. ACM.
Carl Vondrick, Deva R Ramanan, and Donald Patterson,"Efficiently scaling up video annotations with crowdsourced marketplaces", Department of Computer Science, University of California, Irvine, Oct. 18, 2010, appeared in ECCV 2010.
Ron Fredericks, LectureMaker, LLC, www.lecturemaker.com, pp. 1-8, May 26, 2011.

* cited by examiner

Primary Examiner — Daquan Zhao
Assistant Examiner — Syed Hasan
(74) Attorney, Agent, or Firm — Fay Sharpe LLP (57) ABSTRACT Systems and methods are presented for enriching audio/video recordings using annotation data provided by attendees of a presentation, in which annotations from attendees are received by a server which merges and synchronizes the annotation data, performs text data mining to identify key messages and temporal segments of the audio/video data, and constructs an enriched audio/video recording including audio and/or video data as well as segment data and key message data for ease of user navigation.

21 Claims, 4 Drawing Sheets

SYSTEMS AND METHODS FOR ENRICHING AUDIO/VIDEO RECORDINGS

BACKGROUND AND INCORPORATION BY REFERENCE

The exemplary embodiments relate to apparatus and techniques for enrichment of Audio/Video (AV) recordings. Online AV recordings provide a useful format for viewing and/or listening to content originally presented at seminars, meetings, or other speaking venues. These may be used by attendees of the original presentation, for example to refresh their memory about the meeting content, or the recordings provide new content for interested parties who could not attend the original event. However, a viewer listener may have difficulty navigating such recordings to find interesting content, since the recordings are inherently unstructured. Consequently, a user typically has no option other than to listen to or view the entire recording from the beginning to the end. As a result, it can be difficult to find interesting content within an AV recording if it is not played in its entirety. Thus, while AV sharing mediums like YouTube, podcasts and Internet webcasts have become available in ever-increasing numbers and topical varieties, the unstructured character of such AV recordings has made the raw recording generally undesirable, absent post-presentation processing to provide metadata that indicates the nature of the content. Such post-processing typically involves an editor annotating the recording by identifying different portions corresponding to separate topics or subtopics, and providing corresponding summary content. Professional studios offer such services, but the editing process is labor-intensive and expensive. Moreover, such editing is typically time-consuming and error-prone, and subject to biases of the editor that may lead to inaccuracies in the supplemental metadata. Such inaccuracies are more prevalent where the editor is not proficient in the topic of the seminar or meeting. In this regard, semantic segmenting of a recording and identification of key messages is different from the fairly common technique of detecting scene changes within video recordings. Thus, while scene change identification may be a fairly straightforward and simple editing technique, a scene change does not necessarily imply a change of topics, and instead could be a switch to a different camera angle on the speaker. Moreover, a topic change does not necessarily imply a scene change, wherein the audio and/or video can be recording the same view of a single speaker when the speaker changes to a new subject and/or a different speaker may continue discussing the same topic a previous speaker was addressing. Thus, there remains a need for improved techniques and systems to help users navigate more effectively through AV content as the availability of online webcasts and seminars continues to increase.

BRIEF DESCRIPTION

Processor-based systems and techniques are presented for enriching audio video recordings by which attendee-driven metadata and other enhanced content are incorporated with audio and/or video data to facilitate subsequent viewers/listeners navigating effectively through AV content.

A system is provided, which includes a memory storing audio/video data along with annotation data comprising notes taken electronically by attendees using computers, smart devices, etc. The system includes a processor-implemented data fusion component that synchronizes and merges the annotation data received from the attendees, as well as a text data mining component that identifies key message data with two or more key messages and identifies a plurality of temporal segments of the audio/video data and corresponding segment data from the synchronized and merged annotation data. A processor-executed association component is provided which associates the segment data corresponding to each identified temporal segment with a specific time interval in the audio/video data, and associates key message data for each identified key message with a specific time point in the audio/video data. A processor stores the enriched audio/video recording in the memory, including all or a portion of the audio/video data, the segment data, and the key message data.

The data fusion component in certain embodiments synchronizes and merges audio/video data from the attendee computers or smart devices to create synchronized and merged audio/video data, which is stored in the enriched audio/video recording in the memory. In certain embodiments, the data fusion components synchronizes and merges the annotation data to form a time x term matrix having rows corresponding to temporal time ranges of the audio/video data, columns corresponding to terms from the annotation data, and matrix entry values representing the number of occurrences of the corresponding term within the corresponding temporal range. In these embodiments, the data mining component identities the key message data and the temporal segments and corresponding segment data according to the time x term matrix. In certain implementations, moreover, the dating mining component identities the key message data and key messages by performing a summation across the columns of the matrix, identities an integer number of columns corresponding to the highest summation values, and the temporal segments may be identified at least partially according to the time x matrix. In certain embodiments, the enriched audio/video recording comprises association data indicating association of the segment data at specific time intervals and indicating association of the key message data with specific time points in the audio/video data.

In accordance with further aspects of the present disclosure, a method is provided for enriching audio/video recordings. The method includes storing audio/video data corresponding to a presentation along with annotation data received from a plurality of attendee computers or smart devices in an electronic memory, and synchronizing and merging the annotation data. The method further includes identifying key message data including a plurality of key messages from the synchronized and merged annotation data, as well as identifying a plurality of temporal segments and corresponding segment data from the synchronized and merged annotation data. The segment data is associated with a specific time interval in the audio/video data, and key message data for each identified key message is associated with a specific time point in the audio/video data. The method further includes storing an enriched audio/video recording in the electronic memory, including all or a portion of the audio/video data, the segment data, and the key message data.

In certain embodiments, the enriched audio/video recording comprises association data indicating association of the segment data with specific time intervals in the audio/video data and indicating association of the key message data with specific time points in the audio/video data. Certain embodiments of the method further include synchronizing and merging audio/video data to create synchronized and merged audio/video data, and storing the enriched audio/video recording in the memory including the synchronized and merged audio/video data.

In certain embodiments, the method includes synchronizing and merging the annotation data to form a time x term matrix that includes a plurality of rows corresponding to temporal ranges of the audio/video data, a plurality of columns corresponding to terms from the annotation data, and a plurality of matrix entries with values representing the number of occurrences of the corresponding term within the corresponding temporal range, as well as identifying the key message data and temporal segments according to the matrix. In certain embodiments, the method includes identifying the key message data including a plurality of key messages by performing a summation across columns of the matrix, and identifying an integer number of columns corresponding to the highest summation values. In certain implementations, the method involves identifying a plurality of temporal segments by performing a singular value decomposition (SVD) on the time x term matrix.

A computer readable medium is provided in accordance with further aspects of the present disclosure, comprising computer-executable instructions for storing audio/video data received from a plurality of attendee computers or smart devices in an electronic memory, synchronizing and merging the annotation data, identifying key message data including a plurality of key messages from the synchronized and merged annotation data, as well as identifying a plurality of temporal segments of the audio/video data and corresponding segment data from the synchronized and merged annotation data. The computer readable medium comprises further computer-executable instructions for associating the segment data corresponding to each identified temporal segment with a specific time interval in the audio/video data, associating key message data for each identified key message with a specific time point in the audio/video data, and storing and enriched audio/video recording in the electronic memory, including all or a portion of the audio/video data, the segment data, and the key message data. In certain embodiments, the computer readable medium includes computer-executable instructions for synchronizing and merging the annotation data to form a time x term matrix having rows corresponding to temporal ranges, columns corresponding to terms from the annotation data, and matrix entry values representing the number of occurrences of the corresponding term within the corresponding time range, as well as instructions for identifying the key message data and the plurality of temporal segments and corresponding segment data according the time x term matrix.

BRIEF DESCRIPTION OF THE DRAWINGS

The present subject matter may take in us components arrangements of components, and/or in various steps and arrangements of steps. The drawings are only for purposes of illustrating preferred embodiments and are not to be construed as limiting the subject matter.

DETAILED DESCRIPTION

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale.

Figure 1:
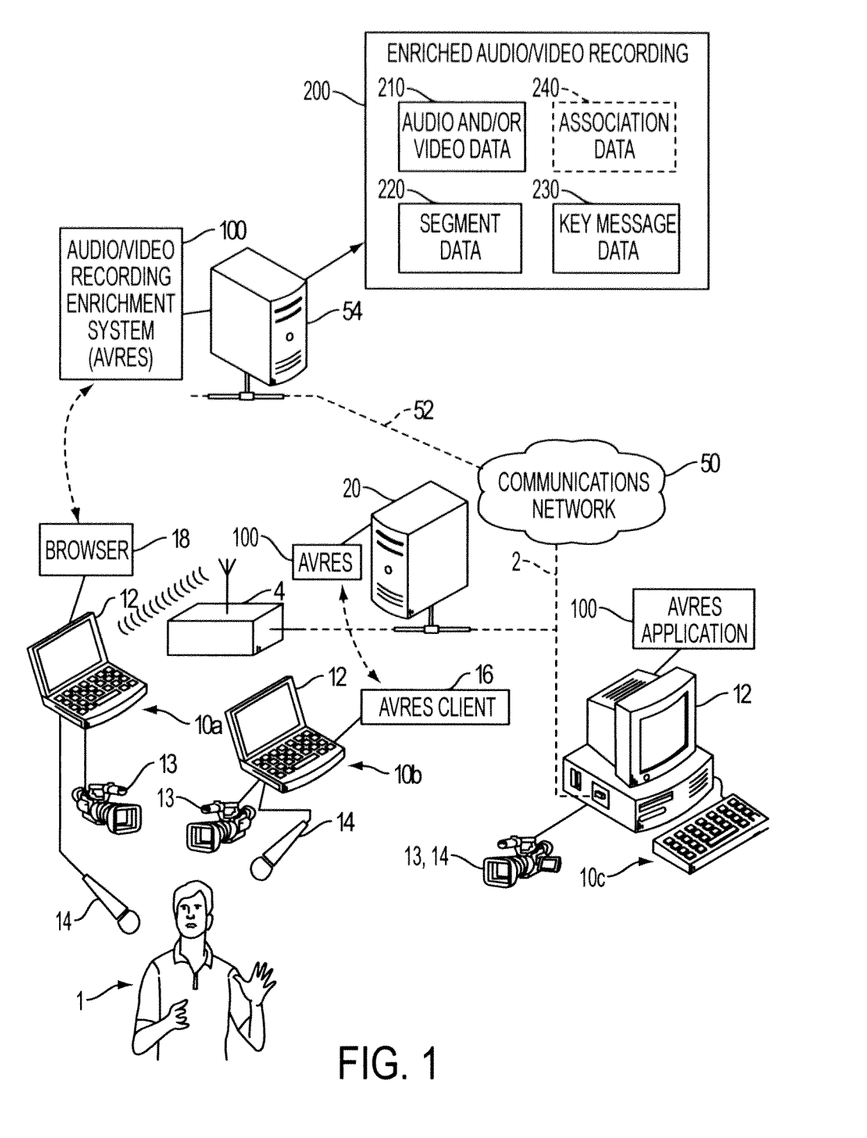
FIG. 1 is a system view illustrating an exemplary computing environment including an audio/video recording enrichment system (AVRES) implemented in a server in accordance with one or more aspects of the present disclosure.
Figure 2:
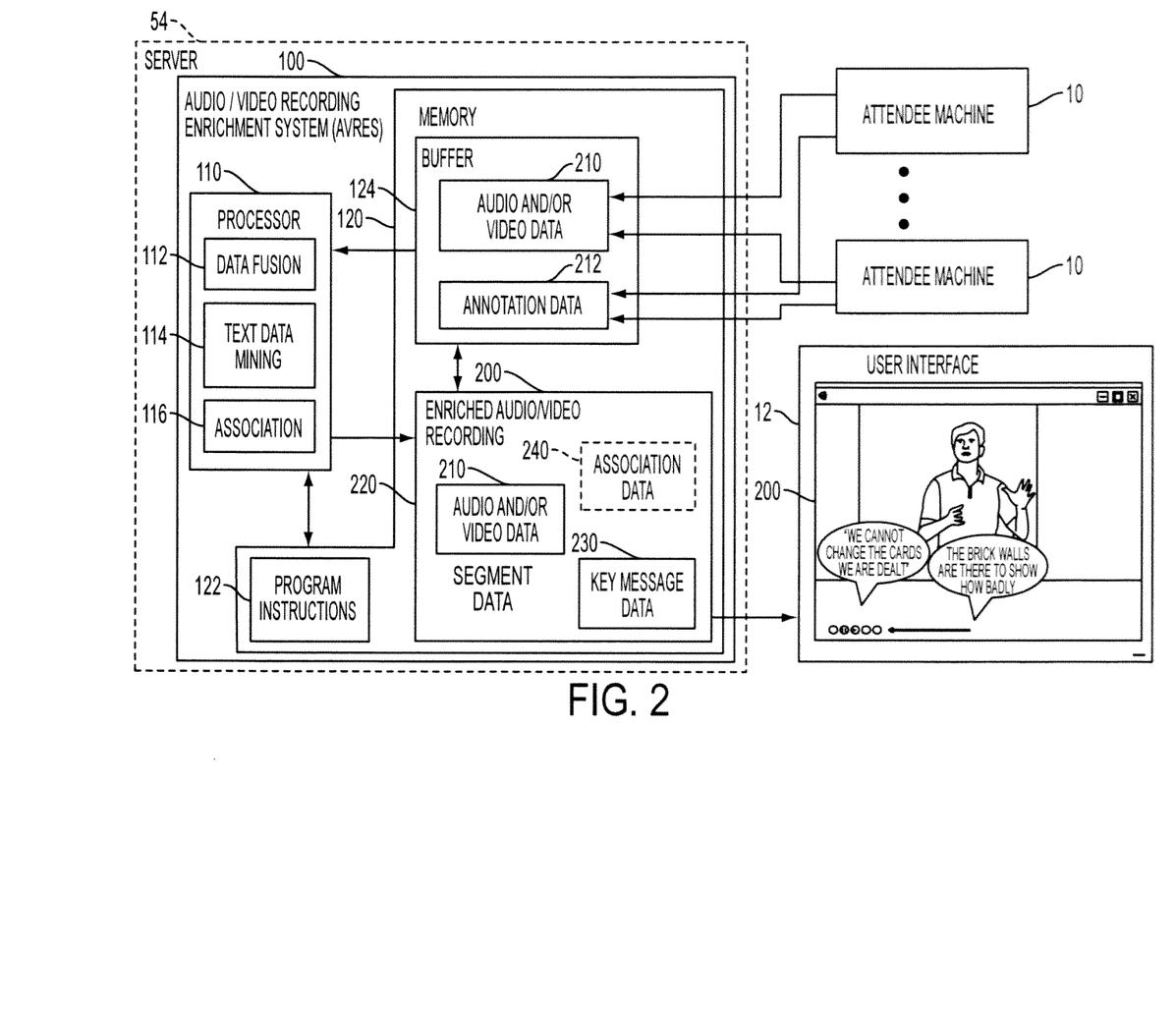
FIG. 2 is a schematic diagram illustrating further details of the exemplary audio/video recording enrichment system of FIG. 1.

FIGS. 1 and 2 illustrate an exemplary networked computing environment including several user computers 10 and a server 20 operatively interconnected with one another via a network 2, with a wireless network transceiver interface 4 providing connectivity for a portable computer 10c to access the network 2. The user computers 10 communicate with other networks 52 by way of an intermediate communications network 50, such as the Internet, where various network gateways and another interconnection apparatus may be provided (not shown). Users of the computers 10, typically attendees at a live presentation for which audio and/or video data 210 is being recorded, can access, execute, or otherwise interact with an audio/video recording enrichment system (AVRES) 100, by way of the computer 10 and a user interface thereof in order to perform various note-taking or annotation tasks, with the user computers 10 providing recorded audio and or video data 210 and/or annotation data 212 to the AVRES 100 through the network connections. With respect to the audio/video data 210, one, some or all of the user computers 10 are equipped with onboard, or external audio microphones 14 and/or video cameras 13 by which audio data and/or video data of a live presentation is obtained by the user computers 10 and is provided to the AVRES 100 through the various network connections. En certain embodiments, laptop computers or other attendee smart devices 10 may include onhoard video cameras 13 and or on-board microphones 14, or external cameras 13 or microphones 14 may be connected to the user device 10 for recording video and audio data at 210 while the user enters annotation data 212.

In this regard, users of the computers 10 may attend a presentation 1, for example a speech or lecture given by a presenter 1 in a lecture hall. The system 100 can be used for enhancing audio/video recordings of any type of presentation that involves audio and/or video data 210, and the disclosed embodiments are not limited to speeches or lectures. Moreover, while the system 200 finds utility in real-time applications in which automatic content enrichment of audio/video content is provided based on audio and/or video data 210 obtained in essentially real-time from attendee computers 10, the system 200 may also be operable to obtain post-presentation annotation data 212 from users viewing a previously recorded presentation 1, and to include such annotation data 212 in combination with annotation data 212 and audio/video data 210 obtained from users attending the presentation 1 in performing recording enrichment operations as set forth herein. Moreover, the audio/video data 210 may be obtained, at least in part, from an external recording device, such as cameras and/or microphones provided by the venue of the original presentation 1, with this data 210 being provided to the system 100.

As seen in the computing environment of FIG. 1, the AVRES 100 can be implemented as a standalone system 100 on a user computer 10a, as a program (e.g., application) 100 running on a server 20 accessed via client software 16 running on a user computer 10b, and/or as a program 100 running on the server 54 accessible via a browser 18 running on a user computer 10c. The computers 10 can be any form of processor-based computing device, including without limitation desktop computers, laptop computers, notebook computers, netbooks, PDAs, tablets, iPads, smart phones, etc. In addition, the users of the computers 10 can perform annotation tasks using the user interfaces 12 of the computers, including keyboards, mouse, and other data entry tools by which note data can be entered into the computers 10, and the computer 10 may be operatively interconnected with one or more smart devices, such as smart phones, smart pens, or other devices by which textual data is provided to the computer 10 based on annotations entered by a user into such a smart devices 10. In particular, smart pens (not shown) allow a user to take notes, with the written characters being digitally provided to an associated computer 10, and likewise smart phones allow a user to enter text corresponding to notes taken during an audio and/or visual presentation 1 attended by the user.

As seen in FIG. 2, the exemplary AVRES 100 is a processor-based system including a processor 110 operatively coupled with an electronic memory 120, where any suitable processing component or components and electronic memory can be used, including without limitation microprocessors, microcontrollers, programmable logic, analog circuitry, and/or combinations thereof, and the various components and functionality of the system 100 can be implemented in a single processing device 110 or may be implemented in distributed fashion among a plurality of processing elements 110. For instance, the system 100 may be implemented via cloud computing to allow for ease of scaling for changing numbers of users by creation of multiple instances running on multiple processing devices. The processor 110 implements various components 112-116 and the system 100 can be implemented, for example, as computer-executable instructions 122 stored in the memory 120 or other non-transitory computer-readable medium (e.g., CD-ROM, flash memory, disk drive, etc.) with the instructions being executed by the processor(s) 110.

The electronic memory 120 in this example provides a buffer 124 that stores audio and/or video data 210 received from user machines 10 and/or from another source (e.g., a microphone 14 and/or video camera 13 operated by a sponsor of the presentation 1), and the memory 120 also stores annotation data 212 received from user devices 10. In addition, as illustrated in FIG. 2, the memory 120 may store the program instructions 122 and/or an enriched audio video recording file or files 200 that individually include all or a portion of originally received audio and/or video data 210, segment data 220, key message data 230, and optionally association data 240 as described in further detail below. The system 100 in certain embodiments provides the finished enriched audio/video recording 200 to any suitable device having a user interface 12, for example, to the user computers 10 or other computer operated by a user wishing to listen to and/or view the recording 200. For instance, the enriched AV recording 200 may be made available to viewers/listeners by way of a website (not shown).

As best seen in FIG. 2, the system 100 includes various components 112, 114 and 116 implemented using the processor 110. Although illustrated in the context of an exemplary implementation in which a single processor 110 implements all three of the components 112-116, other implementations are possible in which multiple processors 110 separately or jointly implement the various components described herein, for example, by execution of corresponding program instructions 122 stored in the memory 120. In operation, the system 100 receives audio and/or video data 210 from two or more attendee machines 10 and/or from an external source, and stores this in a buffer 124 of the memory 120. In addition, the system 100 receives annotation data 212 from the attendee machines 10 (and such annotation data 212 may also be received from post-presentation recording viewers who present such annotation data 212 to the system by way of a corresponding user device 10). The system 100 stores the annotation data 212 in the buffer 124.

A data fusion component 112 is provided in the system 100, implemented using the processor 110, which synchronizes and merges annotation data 212 received into the memory 120 from two or more attendee computers or smart devices 10. This annotation data synchronization and merging may be done using any suitable processing techniques by which notes taken by multiple viewers (e.g., whether live attendees or post-presentation annotators or editors) temporarily synchronized such that notes taken by multiple parties with respect to a given temporal section of an original presentation 1 are associated with one another, and the provided annotation data 212 is merged in temporally synchronized fashion.

In certain embodiments, moreover, where audio/video data 210 is received from multiple sources, the data fusion component 112 is further operable to synchronize and emerge audio/video data 210 from these sources to create synchronized and merged audio/video data 210, and the processor 110 stores the enriched audio/video recording 200 in the memory 120 including the synchronized and merged audio/video data 210. In this regard, although attendees and their user devices 10 may be capturing the audio/video data 210 contemporaneously with one another, the contents of the recorded audio and/or video data 210 may be different, wherein attendees may start the recording at different times during the presentation 1, and the attendees will also typically have different vantage points and recording hardware 13, 14 which may affect the clarity and perspective of the audio/video data 210 obtained by a given attendee device 10. For example, if the event 1 includes multiple speakers, different attendees may record some speakers better than others due to different positions within the presentation venue. The system 100 thus utilizes the data fusion component 112 to merge and synchronize the annotation data 212 from multiple sources, and may provide synchronized and merged audio/video data 210 for use in the enriched AV recording 200.

In addition to the textual content, the merged and synchronized annotation data 212 includes the time in the presentation 1 at which the text was captured. For instance, at the $15^{th}$ minute of the presentation 1, a first attendee may have noted "Graph coloring is a NP hard problem", whereas a second attendee noted "Graph coloring—NP hard" and a third annotator (live attendee or post-presentation user) noted "Graph coloring example of NP hardness". The data fusion component 112 in certain embodiments partitions the entire presentation 1 into segments (e.g., equal or unequal, such as one minute each segment) and constructs a time x term matrix $D=[d_{ij}]$, where $d_{ij}$ represents number of occurrences of term $T_j$ at time $min_i$ from among the notes of all the authors. For example, $d_{12}=5$ represents that at minute 1, the term $T_2$ was used by live authors. An example time x term matrix D is shown below:

|  | Term 1 | Term | Term 3 | ... |
|---|---|---|---|---|
| Min 1 | 5 | 3 | 6 | |
| Min 2 | 1 | 12 | 10 | |
| Min 3 | 10 | 4 | 5 | |
| ... | | | | |

The data fusion component 112 thus provides a single enriched AV recording 200 synchronized with a time x term matrix D that is constructed from the personal notes of the attendees. The time x term matrix D includes a plurality of rows corresponding to temporal time ranges of the audio/video data 210, as well as a plurality of columns corresponding to terms from the annotation data 212, with matrix entries including integer values $d_{ij}$ representing the number of occurrences of the corresponding term within the corresponding temporal range.

The processor 110 of the system 100 also implements a text data mining component 114 to identify key message data to 30 including a plurality of key messages from the synchronized and merged annotation data 212. In addition, the text data mining component 114 identifies a plurality of temporal segments 224 of the audio/video data 210 and corresponding segment data 220 from the synchronized and merged annotation data 212. In the illustrated embodiment, the text data mining component 114 identifies the key message data 230 and the key messages 232 thereof by performing a summation across the columns of the time x term data matrix D, and identifies an integer number of columns of the time x term data matrix D corresponding to the highest summation values. In this regard, as soon as the speaker in a presentation 1 makes an important statement, the attendees typically note the point (with a small time delay). Performing a summation across the columns (terms) for each row (temporal segment) therefore provides an indication of the importance of that time segment 224 in the whole recording, where the importance of a given timeslot (temporal segment) 224 $m_i$ is given by:

$$\mathrm{Imp}(m_i) = \Sigma_j a_{ij}$$

The text data mining component 114 in certain embodiments identities the top few timeslots with the highest importance scores of this summation as the "key messages" or highlights 232 of the meeting. In certain embodiments, moreover, the data mining component 114 identifies the temporal segments 224 of the presentation 1 by performing a Singular Value Decomposition (SVD) on the time x term matrix D. The result of applying SVD on the matrix D in one example is shown below:

$$D_{[m \times m]} = U_{[m \times r]} \Lambda_{[r \times r]} (V_{[n \times r]})^T$$

D: time x term matrix (m temporal segments and n terms)
U: m×r matrix (m temporal segments, r topics)
Λ: r×r diagonal matrix (strength of each 'topic')
V: n×r matrix (n terms and r topics)
From the matrix U, contiguous rows that map to a similar topic are identified as the segments of the enriched AV recording 200.

The system 100 also includes an association component 116 implemented by the processor 110 which associates the segment data 220 corresponding to each identified temporal segment 224 of the audio/video data 210 with a specific time interval in the audio/video data 210. In addition, the association component 116 associates key message data 230 for each identified key message 232 with a specific time point in the audio/video data 210. The processor 110 stores the enriched audio/video recording 200 in the memory 120, including all or a portion of the audio/video data 210, as well as the segment data 220 and the key message data 230. In this regard, as discussed above, the stored audio/video recording data 210 may be the merged and synchronized result of selection of specific portions of the originally received data 210 obtained from the attendee devices 10 and/or from an external source. In addition, in certain embodiments, the association component 116 generates association data 240 indicating association of the segment data 220 with specific time intervals in the audio/video data 210, as well as indicating association of the key message data 230 with specific time points 232 in the audio/video data 210, and the processor 110 stores this association data 240 in the enriched audio/video recording 200 in the memory 120.

Figure 3:
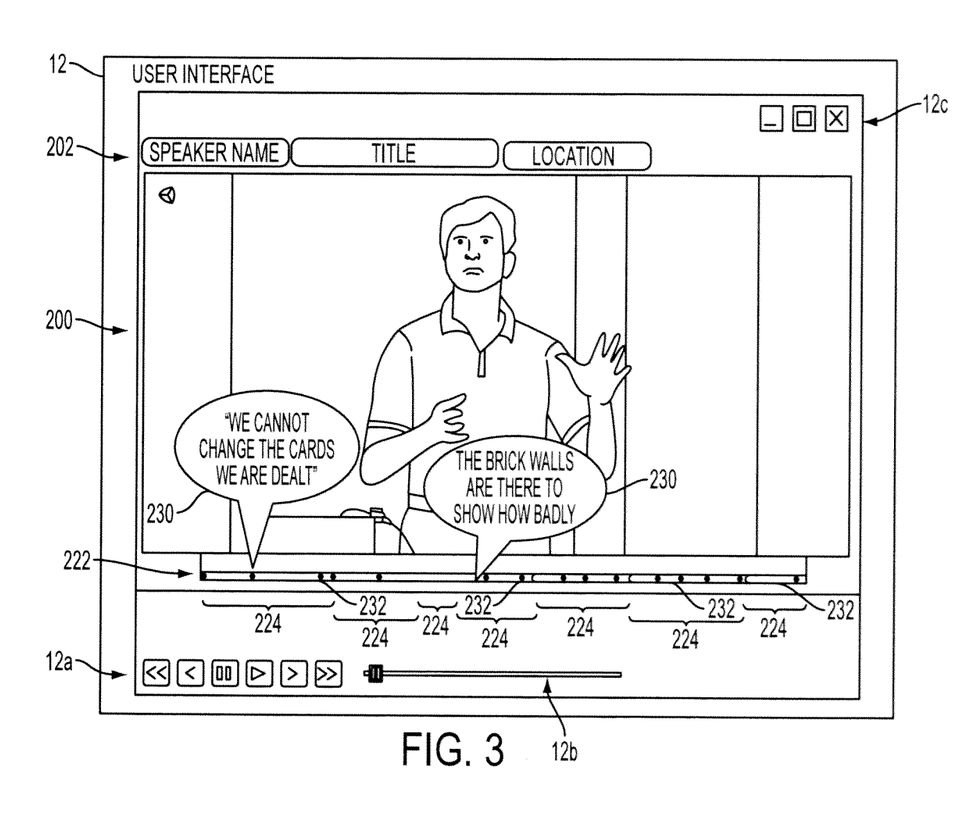
FIG. 3 is a simplified partial front elevation view illustrating an exemplary user interface rendering an enriched audio/video recording with user-actuatable controls and indicia indicating a number of temporal segments and key messages included within the enriched audio/video recording.

Referring also to FIG. 3, in certain embodiments, each temporal segment 224 identified through the data mining process is associated with a time interval in the recording 200, and each key message 232 is associated with a time point in the recording 200. FIG. 3 shows an exemplary rendering of the resulting enriched audio/video recording 200 in a user interface 12. The rendering in this example provides several indicia 202 showing the speaker's name, a presentation title and location, and the recording 200 can be played using one or more playback controls 12a by which a viewer/listener can play, pause, stop, fast-forward, reverse, and the user can also set the current playback position via a slide control feature 12b. The user interface 12 further provides normal window control buttons 12c.

As seen in FIG. 3, the enriched audio/video recording 200 provides the segment data 220 and key message data 230 by way of a segment display portion 222 which includes a series of color-coded horizontal bars individually indicating the automatically identified temporal segments 224. In addition, the recording 200 includes several colored dot features at specific time points in the presentation which were identified by the system 100 as key messages 232. In operation, a viewer/listener can place a mouse or other pointing device over (or otherwise select) a specific one of the key message features 232, and the user interface 12 provides a pop-up screen 230 rendering the corresponding key message data provided by the system 100. In this manner, a user can easily navigate through the various identified key messages 232 to determine content of interest quickly without having to review the entire audio and/or video presentation 200. In certain embodiments, moreover, clicking on a specific dot feature 232 takes the user to the corresponding point in the audio and/or video presentation.

The system thus automatically enriches and AV recording with rich text (e.g., segments 224 and key messages 232), and operates using annotation data 212 obtained from attendees who presumably have a better perspective from which to identify topical segments 224 and key messages 232 than a general video editor. Thus, the enriched content provided by the segments 224 and key messages 232 will be of better quality, and less subject to editor bias and/or inaccuracies. Moreover, since the system 100 obtains such annotation data 212 from multiple attendees and optionally from post-presentation reviewers), individual annotator biases are likely to be lessened or removed from the final enriched segment and key message content/metadata 224 and 232. In this regard, the segments 224 and key messages 232 in certain embodiments are based on a crowdsourcing model (e.g., wherein the results are driven essentially by "voting" results of the contributing annotators), thereby reducing the likelihood of inaccuracies due to mistakes/opinions of the editor. Moreover, the system 100 provides essentially real-time and automatic content enrichment, which is much more cost effective and timely than ordinary submission of an audio/video presentation to an editing studio. Furthermore, the system 100 in certain embodiments provides the enriched AV recording 200 with the segments 224 and the key messages 232 linked to their corresponding locations within the AV content, thereby further facilitating ease of user navigation using the discovered segments and key messages.

In addition, the system 100 advantageously capitalizes on the ubiquitous usage of smart devices (e.g., laptops, smart phones, smart pens, etc.) for example, in classrooms, conference rooms and meeting halls to capture notes from which enriched content is created automatically. Using these ubiquitous devices, the AVRES 100 records the AV contents of a meeting/seminar and simultaneously synchronizes the recording with the notes being captured by the attendees. The AV content and the notes captured by the meeting attendees is uploaded in real time to a serve (e.g., server 54 in FIG. 1), and the system integrates (synchronizes and merges) notes from several attendees to build a crowd sourced notes model. The text data mining component 114 identifies both the segments 224 and the highlights or key messages 232 from the collection, with each identified segment being mapped to a specific temporal region in the recording 200 and each key message 232 being mapped to a specific point in the recording 200. By use of these techniques and systems, and enriched AV presentation 200 is potentially available for viewer/listener consumption (including the enriched content/metadata) essentially immediately following the original presentation 1.

Figure 4:
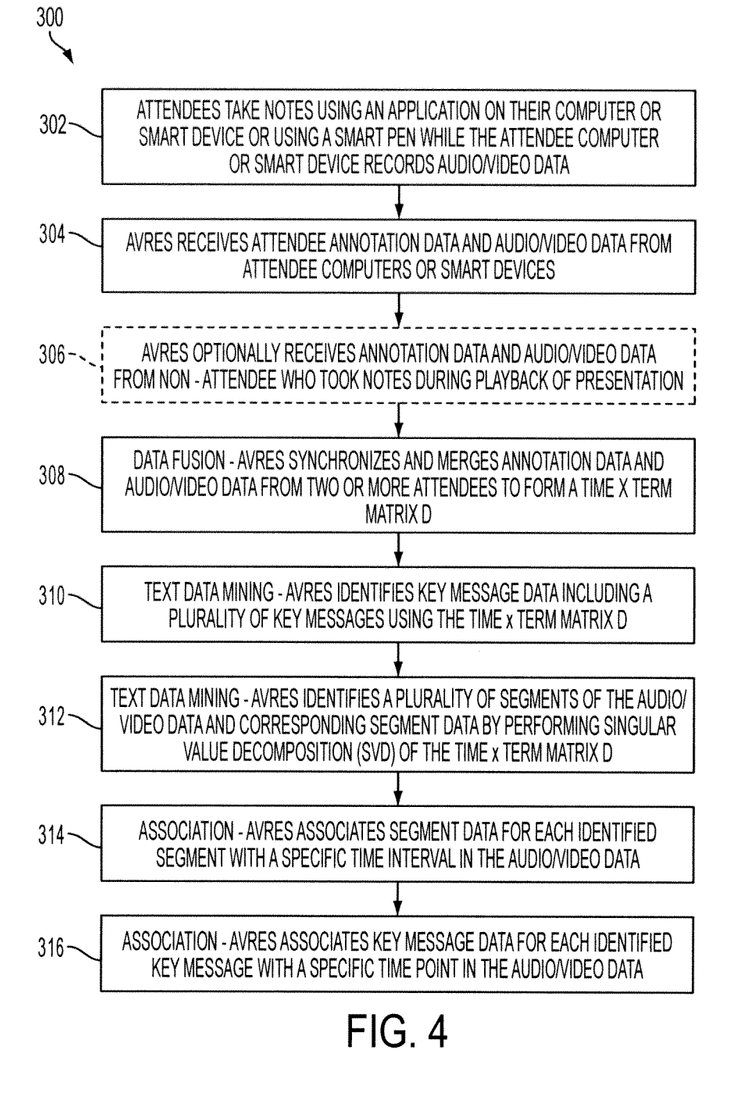
FIG. 4 is a flow diagram illustrating an exemplary method of enriching audio/video recordings in accordance with one or more aspects of the disclosure.

Referring also to FIG. 4, an exemplary method 300 is illustrated for enriching audio/video recordings, including attendees taking notes at 302 using an application on their computer or smart device 10 (and/or using a smart pen) while audio/video data 210 is contemporaneously recorded via the attendee computer or device 10. At 304, audio/video data 210 corresponding to the presentation and annotation data 212 are received from a plurality of attendee computers or smart devices 10 and stored in an electronic memory 120. At 306 in FIG. 4, annotation data 212 and/or audio/video data 210 are optionally received from a non-attendee who did not attend the original presentation 1 (or from other external device), and such are stored in the memory 120. Data fusion is performed at 308 in which the annotation data 212 (and optionally the audio/video data 210) is synchronized and merged. In certain embodiments, as discussed above, this data fusion may include formation of a time x term matrix (matrix D above). At 310 and 312, data mining is performed, including identification at 310 of key message data 230 including a plurality of key messages (232) from the synchronized and merged annotation data 212. At 312, a plurality of temporal segments 224 and corresponding segment data 220 are identified from the synchronized and merged annotation data 212. At 314 and 316, association operations are performed, including associating the segment data 220 at 314 corresponding to each identified temporal segment 224 with a specific time interval in the audio/video data 210, and associating at 316 key message data 230 for each identified key message 232 with a specific time point in the audio/video data 210. At 318, an enriched audio/video recording 200 is published or otherwise made available to end users by storage in an electronic memory 120 including all or a portion of the audio/video data 210, the segment data 220 and the key message data 230. In certain embodiments, as discussed above, the stored enriched audio/video recording 200 may further include association data 240 indicating association of the segment data 220 with specific time intervals 224 in the audio/video data 210 and indicating association of the key message data 230 with specific time points 232 in the audio/video data 210.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A system for enriching audio/video recordings, comprising:
   an electronic memory storing audio/video data corresponding to a presentation and annotation data received from a plurality of attendee computers or smart devices, the annotation data comprising notes taken electronically by attendees of the presentation corresponding to the audio/video data;
   at least one processor operatively coupled with the electronic memory;
   a data fusion component implemented using the at least one processor and operative to synchronize and merge the annotation data; wherein the data fusion component is operative to synchronize and merge the annotation data to form a time x term matrix including:
   a plurality of rows corresponding to temporal time ranges of the audio/video data;
   a plurality of columns corresponding to terms from the annotation data; and
   a plurality of matrix entries including integer values representing the number of occurrences of the corresponding term within the corresponding temporal time range;
   a text data mining component implemented using the at least one processor and operative to identify key message data including a plurality of key messages from the synchronized and merged annotation data and to identify a plurality of temporal segments of the audio/video data and corresponding segment data from the synchronized and merged annotation data according to the time x term matrix; and
   an association component implemented using the at least one processor and operative to associate the segment data corresponding to each identified temporal segment of the audio/video data with a specific time interval in the audio/video data, and to associate key message data for each identified key message with a specific time point in the audio/video data;
   the at least one processor configured to store an enriched audio/video recording in the electronic memory, including all or a portion of the audio/video data, the segment data, and the key message data.

2. The system of claim 1, wherein the data fusion component is operative to synchronize and merge audio/video data from the plurality of attendee computers or smart devices to create synchronized and merged audio/video data, and wherein the at least one processor is configured to store the enriched audio/video recording in the electronic memory including the synchronized and merged audio/video data.

3. The system of claim 1, wherein the text data mining component is operative to identify the key message data including the plurality of key messages by performing a summation across the columns of the time x term matrix, and identifying an integer number of columns of the time x term matrix corresponding to the highest summation values.

4. The system of claim 3, wherein the text data mining component is operative to identify the plurality of temporal segments at least partially according to the time x term matrix.

5. The system of claim 1, wherein the text data mining component is operative to identify the plurality of temporal segments at least partially according to the time x term matrix.

6. The system of claim 5, wherein the text data mining component is operative to identify the plurality of temporal segments by performing a singular value decomposition on the time x term matrix.

7. The system of claim 1, wherein the enriched audio/video recording comprises association data indicating association of the segment data with specific time intervals in the audio/video data and indicating association of the key message data with specific time points in the audio/video data.

8. The system of claim 1, wherein the text data mining component is operative to automatically identify the key message data, and wherein the association component is operative to automatically associate the key message date for each identified key message with a specific time point in the audio/video data.

9. The system of claim 1, wherein the text data mining component is operative to identify the key message data through summation of data across the columns of the time x term matrix and to automatically identify the key message from the time x term data matrix corresponding to a highest summation.

10. A method of enriching audio/video recordings, the method comprising:
storing audio/video data corresponding to a presentation and annotation data received from a plurality of attendee computers or smart devices in an electronic memory, the annotation data comprising notes taken electronically by attendees of the presentation corresponding to the audio/video data;
using at least one processor, synchronizing and merging the annotation data to form a time x term matrix, the time x term matrix comprising:
a plurality of rows corresponding to temporal time ranges of the audio/video data,
a plurality of columns corresponding to terms from the annotation data, and
a plurality of matrix entries including integer values representing the number of occurrences of the corresponding term within the corresponding temporal time range;
using the at least one processor, identifying the key message data including a plurality of key messages from the time x term matrix of the synchronized and merged annotation data;
using the at least one processor, identifying the plurality of temporal segments of the audio/video data and corresponding segment data from the time x term matrix of the synchronized and merged annotation data;

using the at least one processor, associating the segment data corresponding to each identified temporal segment of the audio/video data with a specific time interval in the audio/video data;
using the at least one processor, associating key message data for each identified key message with a specific time point in the audio/video data; and
using the at least one processor, storing an enriched audio/video recording in the electronic memory, including all or a portion of the audio/video data, the segment data, and the key message data.

11. The method of claim 10, further comprising:
using the at least one processor, synchronizing and merging audio/video data to create synchronized and merged audio/video data; and
using the at least one processor, storing the enriched audio/video recording in the electronic memory including the synchronized and merged audio/video data.

12. The method of claim 10, comprising identifying the key message data including the plurality of key messages by performing a summation across the columns of the time x term matrix, and identifying an integer number of columns of the time x term matrix corresponding to the highest summation values.

13. The method of claim 12, comprising identifying the plurality of temporal segments at least partially according to the time x term matrix.

14. The method of claim 10, comprising identifying the plurality of temporal segments at least partially according to the time x term matrix.

15. The method of claim 14, comprising identifying the plurality of temporal segments by performing a singular value decomposition on the time x term matrix.

16. The method of claim 10, wherein the enriched audio/video recording comprises association data indicating association of the segment data with specific time intervals in the audio/video data and indicating association of the key message data with specific time points in the audio/video data.

17. The method of claim 10, comprising:
automatically identifying the key message data using the at least one processor; and
automatically associating the key message data for each identified key message with a specific time point in the audio/video data using the at least one processor.

18. The method of claim 10, comprising:
performing a summation across the columns of the time x term data matrix; and
identifying an integer number of columns of the time x term data matrix corresponding to the highest summation values, wherein the top few timeslots with the highest importance scores of the summation are identified as key messages.

19. A non-transitory computer readable medium comprising computer-executable instructions for enriching audio/video recordings, the computer readable medium comprising computer-executable instructions for:
storing audio/video data corresponding to a presentation and annotation data received from a plurality of attendee computers or smart devices in an electronic memory, the annotation data comprising notes taken electronically by attendees of the presentation corresponding to the audio/video data;
synchronizing and merging the annotation data to form a time x term matrix, the time x term matrix comprising:
a plurality of rows corresponding to temporal time ranges of the audio/video data;

a plurality of columns corresponding to terms from the annotation data; and a plurality of matrix entries including integer values representing the number of occurrences of the corresponding term within the corresponding temporal time range;

identifying key message data including a plurality of key messages from the synchronized and merged annotation data according to the time x term matrix;

identifying a plurality of temporal segments of the audio/video data and corresponding segment data from the synchronized and merged annotation data according to the time x term matrix;

associating the segment data corresponding to each identified temporal segment of the audio/video data with a specific time interval in the audio/video data;

associating key message data for each identified key message with a specific time point in the audio/video data; and storing an enriched audio/video recording in the electronic memory, including all or a portion of the audio/video data, the segment data, and the key message data.

20. The non-transitory computer readable medium of claim 19, comprising computer executable instructions for:
automatically identifying the key message data; and
automatically associating the key message data for each identified key message with a specific time point in the audio/video data.

21. The non-transitory computer readable medium of claim 19, comprising computer-executable instructions for:
performing a summation across the columns of the time x term data matrix; and
identifying an integer number of columns of the time x term data matrix corresponding to the highest summation values, wherein the top few timeslots with the highest importance scores of the summation are identified as key messages.

* * * * *